(12) United States Patent
Kojiro

(10) Patent No.: US 6,356,540 B1
(45) Date of Patent: Mar. 12, 2002

(54) METHOD FOR ALLOCATING FREQUENCY CARRIER IN CELLULAR SYSTEM

(75) Inventor: Hamabe Kojiro, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/139,879

(22) Filed: Aug. 25, 1998

(30) Foreign Application Priority Data

Aug. 28, 1997 (JP) .............................................. 9-245910

(51) Int. Cl.⁷ .................................................. H04J 4/00
(52) U.S. Cl. ........................ 370/330; 370/436; 370/478
(58) Field of Search ................................ 370/281, 295, 370/330, 345, 343, 344, 480, 484, 436, 319, 478; 455/450, 451, 452, 453, 509

(56) References Cited

U.S. PATENT DOCUMENTS

| | | | |
|---|---|---|---|
| 5,594,738 A | * 1/1997 | Crislen et al. | 370/347 |
| 5,729,534 A | * 3/1998 | Jokinen et al. | 370/280 |
| 5,805,633 A | * 9/1998 | Uddenfeldt | 375/202 |
| 5,845,178 A | * 12/1998 | Bamburak et al. | 455/31.1 |
| 6,016,311 A | * 1/2000 | Gilbert et al. | 370/280 |

\* cited by examiner

*Primary Examiner*—Douglas Olms
*Assistant Examiner*—Ken Vanderpuye
(74) *Attorney, Agent, or Firm*—Scully, Scott Murphy & Presser

(57) ABSTRACT

A frequency carrier allocating method is provided which can effectively utilize frequency carriers when the traffic of the uplink is asymmetric to that of the downlink in the FDD cellular system. Plural frequency carriers are arranged in each of two frequency bands FB1 and FB2. Base stations are divided into two groups BSG1 and BSG2. In the group BSG1, frequency carriers in the frequency band FB1 are allocated to the downlink of a base station while frequency carriers in the frequency band FB2 are allocated to the uplink thereof. In the group BSG2, frequency carriers in the frequency band FB2 are allocated to the downlink of a base station while frequency carriers in the frequency band FB1 are allocated to the uplink thereof. Bi-directional communication is performed between the base station and a mobile station using the frequency of the frequency carrier.

10 Claims, 6 Drawing Sheets

METHOD FOR ALLOCATING FREQUENCY CARRIER IN CELLULAR SYSTEM

BACKGROUND OF THE INVENTION

The present invention relates to a frequency carrier allocating method suitable in the FDD (Frequency Division Duplex) cellular system where bidirectional communication is performed between a base station and mobile stations by using different frequency carriers in up-stream and down-stream. Particularly, the present invention relates to a frequency carrier allocating method suitable in a cellular system that provides multimedia communication services in which the traffic in up-stream is asymmetric with the traffic in down-stream and in which a base station allocates a frequency carrier not used by neighbor cells according to traffic.

In the FDD cellular system, the base station simultaneously performs its down-stream transmitting operation and its up-stream receiving operation using different frequency carriers while the mobile station simultaneously performs its up-stream transmitting operation and its down-stream receiving operation using different frequency carriers. The base station communicates with many mobile stations within a cell using plural frequency carriers. Many frequency carriers can be used within one cell simultaneously and repeatedly using each frequency carrier within plural cells geographically remote from each other.

In the transmitter/receiver shown in FIG. 8, an interference power measurement circuit 830 and plural receiving circuits 840, plural transmission circuits 850 are connected to antenna 810 via the transmit/receive duplexer 820. A mobile station, as shown in FIG. 9, includes a receiving circuit 940 and a transmission circuit 950 which are connected to the antenna 910 via the transmit/receive duplexer 920. The base station uses a transmit/receive duplexer for achieving separation between a transmission signal and a received signal each having a different frequency. The mobile station uses a transmit/receive duplexer for achieving separation between a transmission signal and a receive signal each having a different frequency. However, since the difference in level between the transmission signal and the receive signal is large, the two signals must be sufficiently separated from each other. Hence, it is required that the frequency interval between the frequency group in the up-stream and the frequency group in the down-stream is sufficiently larger than that between frequency carriers used in the same direction.

For that reason, in the FDD system, as shown in FIG. 10, the transmit/receive duplexer uses two frequency bands spaced away by a necessary frequency interval to separate the transmission signal and the receiving signal. One frequency band is allocated only for the up-stream while the other frequency band is allocated only for the down-stream. Hence, the number of carriers usable in each stream is fixed. Normally, two frequency bands are equal in bandwidth. The number of frequency carriers usable in the up-stream is the same as that in the down-stream.

Hence, there has the problem that when the ratio of the width of one frequency band to the width of the other frequency band differs from that of the upper-stream traffic to the down-stream traffic, the frequency band in traffic decreasing direction cannot be sufficiently used. In order to solve such a problem, JP-A-275230/1996 discloses the method of making the frequency carrier pass band in a down-stream larger than that in an up-stream and alternately interchanging the up-stream frequency carrier and the down-stream frequency carrier in each frequency band.

In this method, a frequency carrier in a frequency band which is different in the up-stream and the down-stream is allocated to each mobile station. Thus, the frequency band use efficiency is improved when the traffic in the down-stream is larger than that in the up-stream while the transmission to receive interval necessary for the transmit/receive duplexer is reserved.

In the prior art, the frequency use efficiency is maximized when the ratio of the information amount in the up-stream to the information amount in the down-stream is equal to that of the passage band for the up-stream to the passage band for the down-stream. However, the prior art has the problem in that frequency-carriers are not optimally allocated in the frequency band when the information amount ratio is not equal to the passage band ratio, so that the frequency band use efficiency is decreased. Where it is difficult to predict the ratio of the information amount in the up-stream to the information amount in the down-stream, or the ratio changes during the system operation, or the information transmission efficiency per frequency band changes due to future technical advances, the problem is whether or not the frequency band is adaptively allocated in the up-stream and the down-stream.

SUMMARY OF THE INVENTION

The objective of the present invention is to solve the above-mentioned tasks.

The object of the present invention is to provide a frequency carrier allocating method that adaptively allocates frequency carriers in each direction according to a change in the ratio of a traffic in up-stream to a traffic in down-stream while the frequency interval between the frequency carrier in up-stream and the frequency carrier in down-stream is maintained at a fixed value or more in each base station.

Another object of the present invention is to provide a frequency carrier allocating method that can always provide a high frequency use efficiency even if the ratio of a traffic in up-stream to a traffic in down-stream varies.

In order to accomplish the above mentioned objects, the objective of the present invention is achieved by the frequency carrier allocating method for a cellular system, the cellular system including plural base stations and plural mobile stations, the cellular system having two frequency bands each in which plural frequency carriers each divided into plural time slots are arranged and in which frequencies are not overlapped, each of the plural base stations allocating a frequency carrier and a time slot in a down-stream for transmission from a base station to a mobile station according to a communication request from a mobile station and allocating a frequency carrier and a time slot in an up-stream for transmission from a mobile station to a base station according to a communication request from a mobile station, so that the cellular system performs bi-directional communications between the base station and the mobile station, the method comprising the steps of dividing the plural base stations into two groups including a first group and a second group; allocating a frequency carrier used in an up-stream from a first frequency band among the two frequency bands in a base station belonging to the first group, and allocating a frequency carrier used in a down-stream from a second frequency band among the two frequency bands in the base station belonging to the first group; and allocating a frequency carrier used in an up-stream from a second frequency band among the two frequency bands in a base station belonging to the second group, and allocating a frequency carrier used in a down-stream from a first frequency band among the two frequency bands in the base station belonging to the second group.

In the frequency carrier allocating method according to the present invention, the required number of time slots for a frequency carrier are allocated according to a traffic in an up-stream and a traffic in a down-stream.

In the frequency carrier allocating method according to the present invention, the same number of the base stations belonging to the two groups is substantially included in a given group of cells each in which the same frequency carrier cannot be simultaneously used; and each of the base stations are located to be adjacent to more base stations belonging to different group.

In the frequency carrier allocating method according to the present invention, the frequency carrier allocating step comprises the steps of sequentially selecting from one side of the frequency carrier arrangement in each frequency band in a base station belonging to the first group; sequentially selecting from the other side of the frequency carrier arrangement between base stations belonging to the second group; and allocating a frequency carrier first-satisfying a quality condition.

According to the present invention, the frequency carrier controlling method further comprises the step of dynamically allocating a frequency carrier and time slot in accordance with an increase or decrease in the up-stream traffic and the down-stream traffic of each base station.

Base stations are divided in groups in such a manner that among an arbitrary group of cells in which the same frequency carriers cannot be simultaneously used, a half of base stations substantially belongs to one group while base stations as many as possible are located adjacent to base stations belonging to another group.

Moreover, a frequency carrier is dynamically allocated according to the traffic ratio or traffic variation in the up-stream and the down-stream of each base station. In a frequency carrier allocating operation, a base station belonging to the same group selects frequency carriers in the same order in each frequency band and selects frequency carriers in a reverse order between base stations belonging to a different group, so that a frequency carrier first-satisfying quality conditions is allocated.

BRIEF DESCRIPTION OF THE DRAWINGS

This and other objects, features and advantages of the present invention will become more apparent upon a reading of the following detailed description and drawings, in which.

DESCRIPTION OF THE EMBODIMENTS

Figure 1:
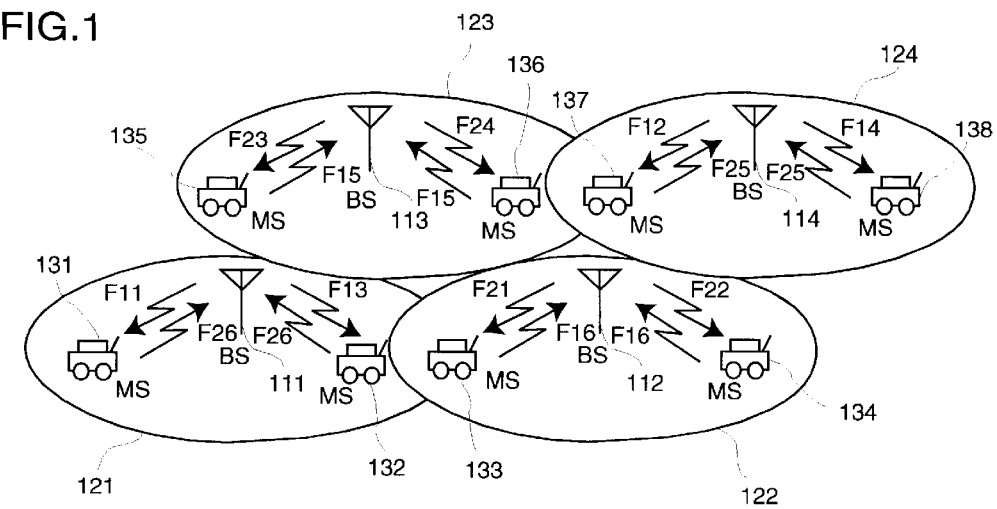
FIG. 1 is a conceptual diagram illustrating a cellular system according to an embodiment of the present invention.

FIG. 1 is a conceptual diagram illustrating a cellular system employing the frequency carrier allocating method according to an embodiment of the present invention. Referring to FIG. 1, the cellular system includes base stations (BS) 111 to 114, cells 121 to 124, and mobile stations 131 to 138. Other cells are located adjacent to the cells 121 to 124 and each cell accommodates a great number of mobile stations.

Figure 8:
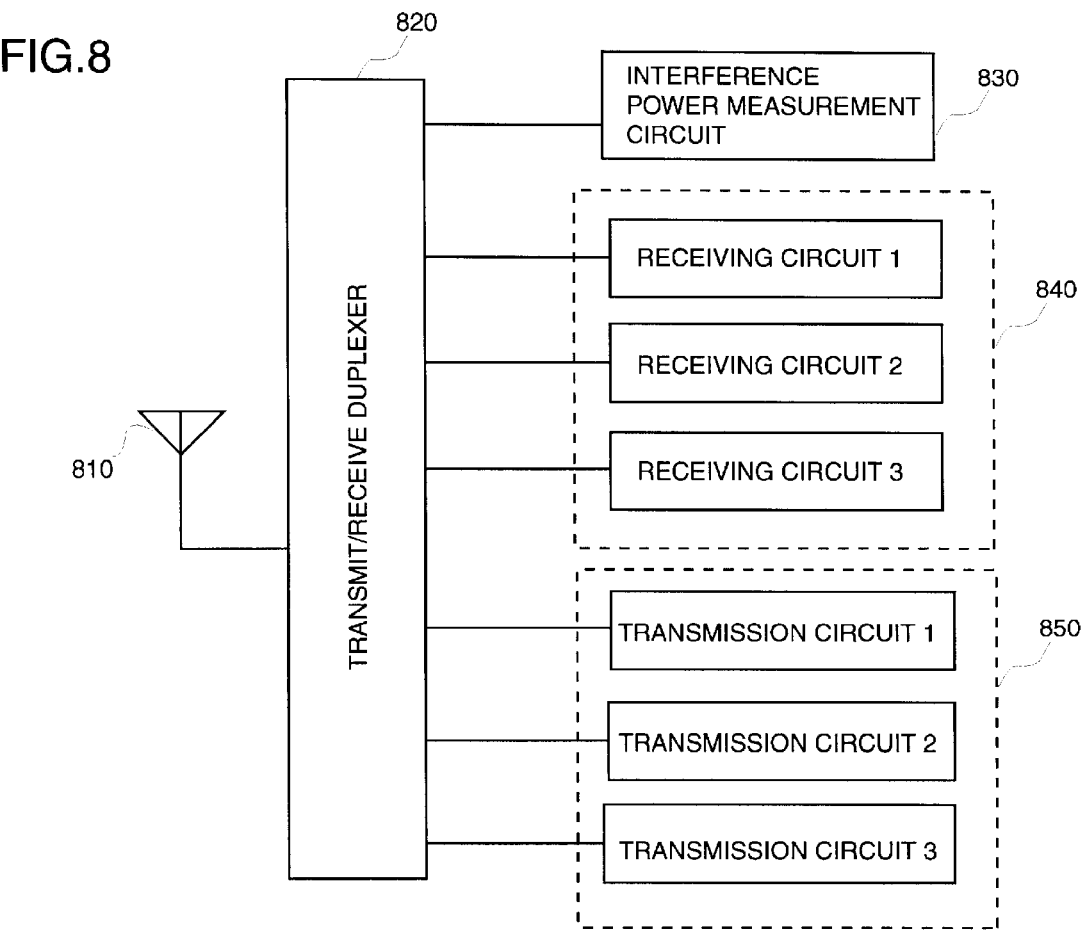
FIG. 8 is a block diagram Illustrating a transmitter and receiver device of a base station.
Figure 9:
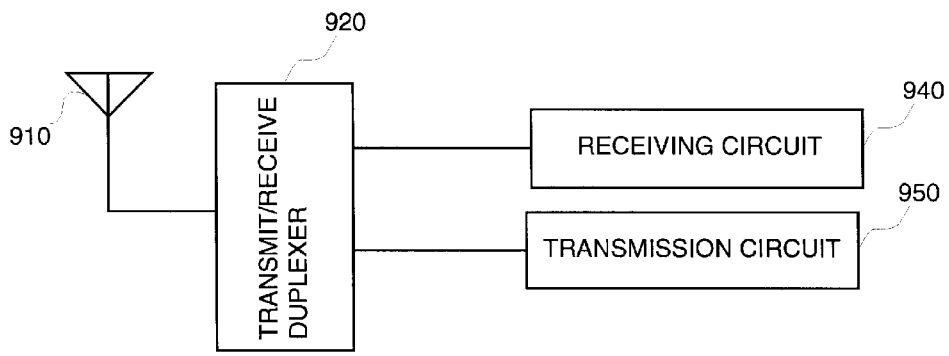
FIG. 9 is a block diagram illustrating a transmitter and receiver device of a mobile station.
Figure 10:
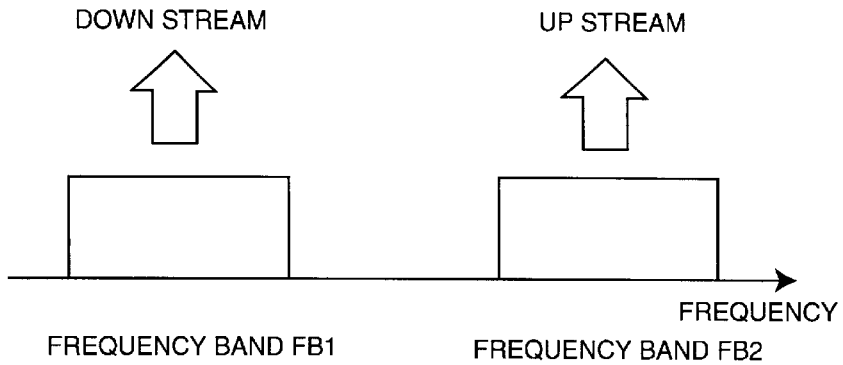
FIG. 10 is a block diagram illustrating a conventional frequency carrier allocating method.

As shown in FIG. 8, the transmitter/receiver in a base station includes an interference power measurement circuit 830, plural receiving circuits 840, and plural transmission circuits 850. These elements are connected to a base station antenna 810 via the transmit/receive duplexer 820. In the transmitter/receiver, as shown in FIG. 9, the receiving circuit 940 and the transmission circuit 950 are connected to the mobile station antenna 910 via the transmit/receive duplexer 920.

Figure 2:
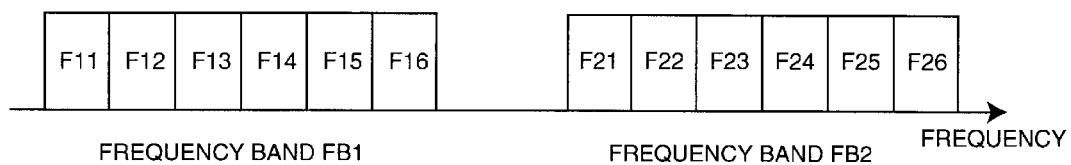
FIG. 2 is a diagram illustrating an arrangement of frequency bands and an arrangement of frequency carriers according to an embodiment of the present invention.

The cellular system according to the present invention, as shown in FIG. 2, uses two frequency bands FB1 and FB2. In order to achieve separation between a receive signal and a transmission signal in the transmit/receive duplexer 820 in a base station and in the transmit/receive duplexer 920 in a mobile station, the two frequency bands are disposed with a necessary frequency interval. Many frequency carriers are normally arranged in each frequency band. Here, the case where six frequency carriers are arranged will be described with reference to FIG. 2.

Figure 3:
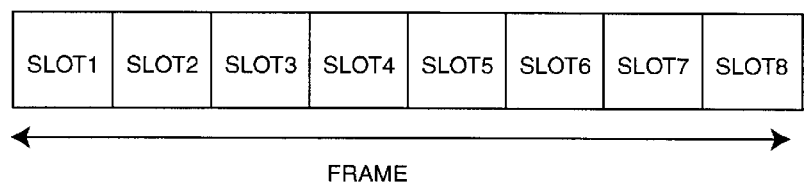
FIG. 3 is a diagram illustrating a frame configuration of frequency carriers according to an embodiment of the present invention.

Six frequency carriers F11, F12, F13, F14, F15 and F16 are arranged in the frequency increasing order in the frequency band FB1. Six frequency carriers F21, F22, F23, F24, F25 and F26 are arranged in the frequency increasing order in the frequency band FB2. Each frequency carrier, as shown in FIG. 3, is divided into plural slots (SLOT1 to SLOT8). One frame is formed of a fixed number of slots and is repeatedly arranged in time. Here, one frame formed, for example, of 8 slots will be described below.

The base stations are divided into two groups BSG1 and BSG2. In an arbitrary group of cells in which the same frequency carrier cannot be simultaneously used, a nearly half of the base stations belong to one group. Base stations as many as possible are located close to base stations belonging to another group.

Figure 4:
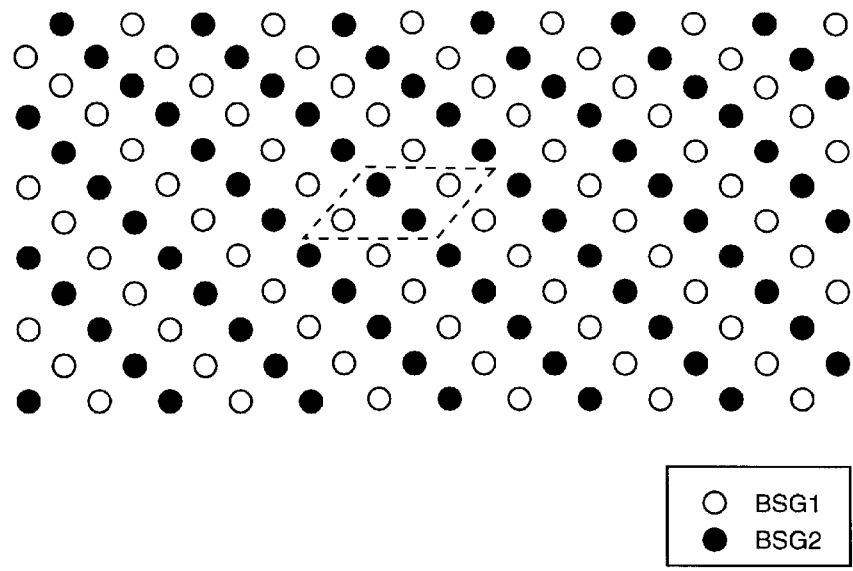
FIG. 4 is a diagram illustrating the distribution of base stations belonging to two groups according to the present invention.

FIG. 4 depicts an example where base stations are grouped under conditions that the same frequency carrier can be repeatedly utilized every seven cells. Referring to FIG. 4, white circles and black circles show the locations of base stations. White circles represent base stations belonging to the group BSG1 while black circles represent base stations belonging to the group BSG2. Seven cells cannot use the same frequency carrier. In this arrangement, the seven cells of a given cell plus six cells are formed of three cells belonging to one group and four cells belonging to the other group. The base stations belonging to one group is nearly halved. Each base station is located neighbor to six base stations in which four base stations belong to a different group.

If five base stations neighbor to one base station belong to a different group, five base stations among seven cells in which the same frequency carriers cannot be simultaneously used belong to one group while the remaining two base stations belong to the other group. Hence, the frequency use efficiency is deteriorated because the condition that a nearly half of base stations belong to one group is not satisfied. FIG. 4 shows the arrangement where four base stations among neighbor base stations belong to a different group. This arrangement satisfies both the condition that base stations as many as possible are located neighbor to base stations belonging to another group and the condition that an arbitrary group formed of cells in which the same frequency carrier cannot be simultaneously used is occupied by a nearly half of base stations belonging to one group. Four base stations shown in FIG. 1 correspond to four base stations surrounded with dotted lines in FIG. 4.

Figure 5:
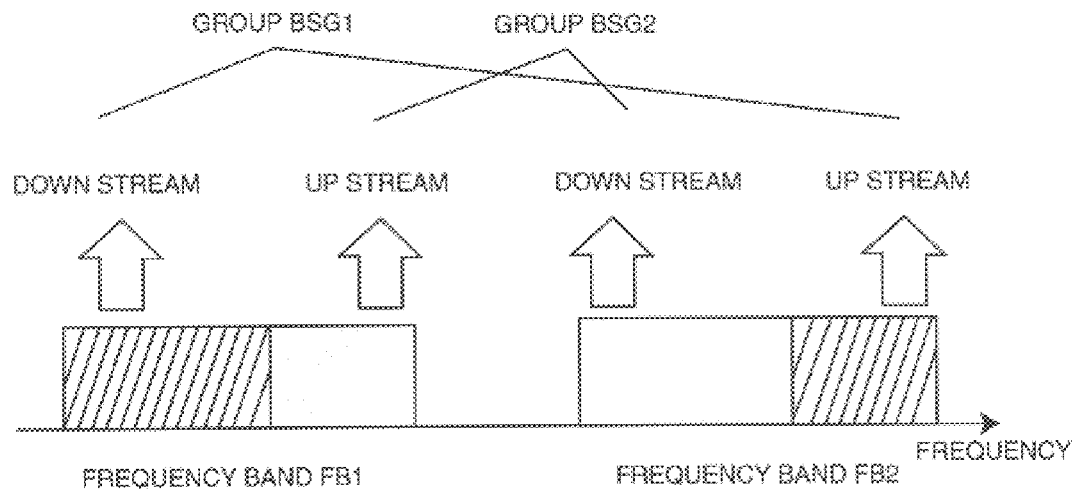
FIG. 5 is a diagram for explaining the frequency carrier allocating method according to the present invention.

The frequency carrier used in the same direction is selected from a different frequency band depending on the groups of base stations. In each base station group, the frequency carrier used in the opposite direction is selected from the other frequency band. As shown in FIG. 5, when a frequency carrier used in the down-stream is selected, the base station belonging to the base station group BSG1 selects a frequency carrier from the frequency band FB1 while the base station belonging to the base station group BSG2 selects a frequency carrier from the frequency band FB2 which is different from that of the base station BSG1. When the frequency carrier in the up-stream, or the opposite direction, is selected, the base station belonging to the base station group BSG1 selects the frequency carrier from the frequency band FB2 while the base station belonging to the base station group BSG2 selects the frequency carrier from the frequency band FB1.

When the frequency carrier is dynamically allocated according to an increase or decrease in traffic, the base station belonging to the same group selects a frequency carrier in the same order in each frequency band while a frequency carrier is selected between base stations belonging to a different group in the reverse order. Thus, a frequency carrier first-satisfying its quality condition is allocated.

That is, the base station belonging to the group BSG1 in the frequency band FB1 selects a frequency carrier in the down-stream in the frequency increasing order. The base station belonging to the group BSG2 in the same frequency band FB1 selects a frequency carrier in the up-stream. In this case, the base station belonging to the group BSG1 selects frequency carriers in the frequency decreasing order. Similarly, in the frequency band FB2, when the base station belonging to the group BSG2 selects a frequency carrier in down-stream, a lower frequency carrier is selected in the increasing order. When the base station belonging to the group BSG1 selects a frequency carrier in the up-stream, a higher frequency carrier is selected in the frequency decreasing order.

The base station uses a required number of frequency carriers according to information amount which are exchanged with all mobile stations to be communicated. When the frequency carrier to be used is added, the base station selects frequency carriers in the above-mentioned order and uses a frequency carrier first-satisfying the quality condition. In order to judge whether or not the quality condition is satisfied, the interference power measurement circuit in a base station sets the selected frequency carrier to a frequency and measures its received power. When the received power is smaller than a predetermined value, it is judged that the quality condition is satisfied.

When the frequency carrier becomes a non-use state after completion of the communication with the base station is completed, it is released. The base station communicates with each mobile station by allocating a required number of slots in the up-stream and down-stream. In this embodiment, the mobile station includes one receiving circuit and one transmission circuit and can allocate up to 8 slots in communications in the up-stream and the down-stream of one mobile station.

Figure 6:
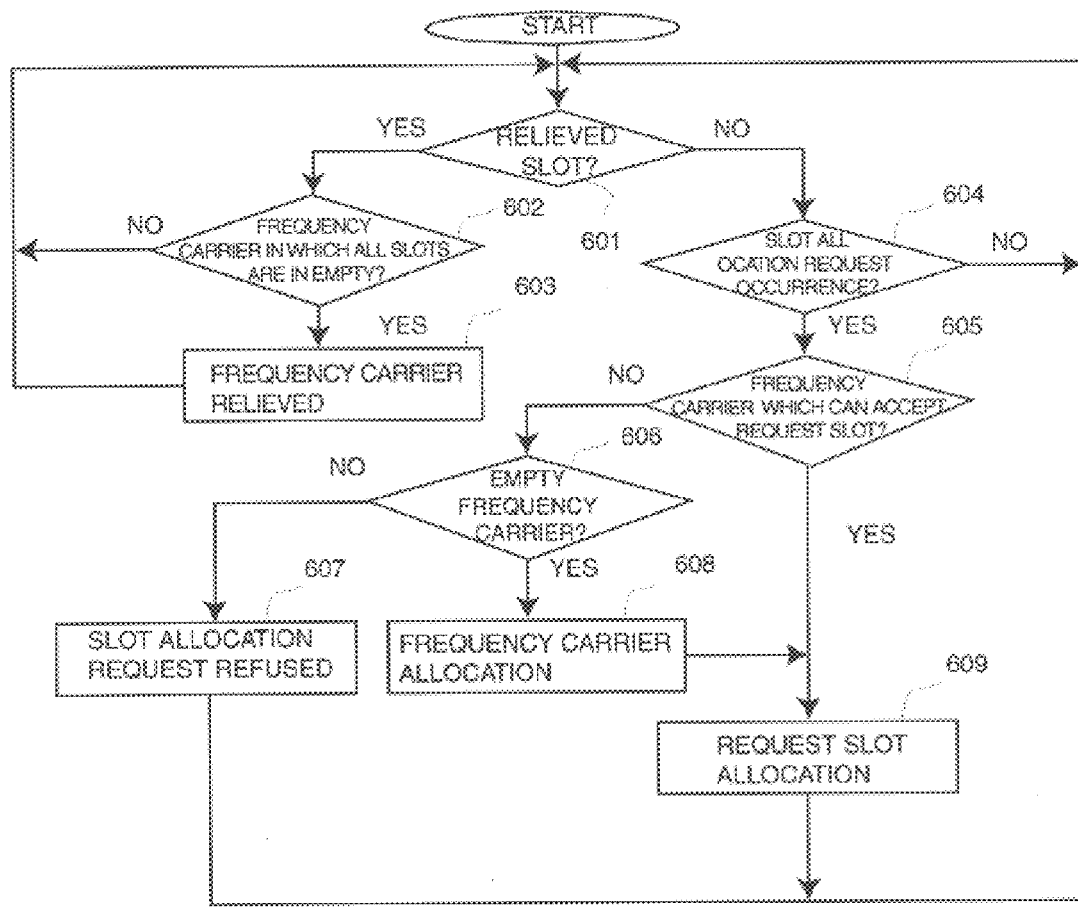
FIG. 6 is a flowchart explaining the method for allocating frequency carriers and time slots according to the present invention.

FIG. 6 is a flowchart illustrating addition and deallocation of a frequency carrier and allocation of a slot in a base station. Referring to FIG. 6, a base station monitors the use state of a slot being used in communications with a mobile station. When the slot is deallocated (step 601), presence or absence of frequency carriers in which all slots are in an idle (or empty) state is checked for (step 602). If such a frequency exists, the frequency carrier is relieved (step 603). When released slots does not exist in the step 601, the presence of a slot allocation request is checked for (step 604). If there is no slot allocation request, the flow is repeated from the step 601.

When there is a slot allocation request in the step 604, and frequency carriers in which a required number of slots in an idle state exist among frequency carriers in a use state in the base station, the flow is repeated from the step 601 by allocating a requested slot (step 609). When there are in the step 605 no frequency carriers in which a required number of slots in an idle state exists, frequency carriers not used in neighbor cells are searched (step 606). When a frequency carrier in an idle state exists, it is made in a use state in the base station (step 608). Next, the flow goes to the step 609 and then a requested slot is allocated. When there are no frequency carriers in an idle state in the step 606, the slot allocation request is rejected (step 607). Then the flow is repeated from the step 601.

Next, the frequency carrier allocating operation in each cell will be described using the cellular system shown in FIG. 1. In the cellular system shown in FIG. 1, the base stations 11 and 114 belong to the group BSC1 while the base stations 112 and 113 belong to the group BSG2. In explanation, it is assumed that base stations corresponds to the base stations in the cell contained in the range where frequency carriers are interfered to each other.

Each base station measures a frequency carrier interference power and makes the frequency carrier in a use state when the power is less than a predetermined value. The predetermined value is determined by setting as a reference the received power level of a signal from a mobile station positioned on the cell boundary. The interval between cells is determined in which the same frequency carriers are repeatedly used based on the reference value. All base stations which require 8 slots in the down-stream and one slot in the up-stream will be described below.

When the mobile station 131 first-requests slot allocation, the base station 111 belonging to the group BSG1 sequentially selects the frequency carrier in the down-stream from the frequency band FB1 in the frequency increasing order from the lowest frequency so that the down-stream frequency carrier F11 is made in a use state. On the other hand, since frequency carriers are sequentially selected from frequency carrier band FB2 in the frequency decreasing order from the highest frequency carrier, the frequency carrier F26 is made in a use state. Communications between the base station 111 and the mobile station 131 is started by allocating 8 slots SLOT1 TO SLOT8 in the down-stream and one slot SLOT1 in the up-stream from the frequency carrier F26.

Secondly, when the mobile station 137 requests slot allocation, the base station 114 belonging to the group BSG1 including the base station 111 selects a frequency carrier in the down-stream among the frequency band FB1 in the frequency increasing order. However, since the interference power of the frequency carrier F11 is measured larger than a predetermined value because the base station 111 receives the down-stream signal. Subsequently, the frequency carrier F12 is made in a use state by measuring the interference power of the frequency carrier F12 and confirming that the measured value is smaller than a predetermined value. In the up-stream operation, when the interference power of the frequency carrier F26 is measured, the up-stream signal of the mobile station 131 is received, so that the frequency carrier F25 is made in a use state. Thus communications between the base station 114 and the mobile station 137 is started by allocating 8 slots SLOT1 TO SLOT8 of the frequency carrier F12 in the down-stream and one slot SLOT1 of the frequency carrier F25 in the up-stream.

Thirdly, when the mobile station 132 requests slot allocation, the base station 111 newly allocates 8 slots SLOT1 TO SLOT 8 by making the frequency carrier F13 in a use state because all slots in the frequency carrier F11 in the down-stream have been already allocated while the interference wave power more than a predetermined value in the frequency carrier F12 from the base station 114 is measured. Since the base station 111 uses only the SLOT1 of the frequency carrier F26 in the up-stream and seven slots are in an idle state, communications between the base station 111 and the mobile station 132 is started by allocating to the mobile station 132 one slot SLOT2 from the frequency carrier F26 in the up-stream.

Fourthly, when the mobile station 138 requires slot allocation, the base station 114, in a similar manner previously described, starts to do communication by newly making the frequency carrier F14 in the down-stream in a use state, allocating 8 slots SLOT1 to SLOT8, and allocating one slot SLOT2 from the frequency carrier F25 in the up-stream.

Next, in the cell 122 accommodating the base station 112 belonging to the group BSG2, when the mobile station 133 requests slot allocation, frequency carriers are selected from the frequency band FB2 in the frequency increasing order from the lowest frequency. Thus, the mobile station 133 allocates 8 slots SLOT1 to SLOT8 by making the frequency carrier F21 in a use state. On the other hand, because frequency carriers are selected from the frequency band FB1 in the frequency decreasing order from the highest frequency, communications between the base station 112 and the mobile station 133 is started by making the frequency band F16 in a use state and allocating one slot SLOT1.

Subsequently, when the mobile station 134 requests slot allocation, the base station 112 allocates 8 slots SLOT1 to SLOT8 of the down-stream frequency carrier and allocates one slot SLOT2 from the up-stream frequency carrier F16 in a use state.

Similarly, when the mobile station 135 requests slot allocation, the base station 113 allocates 8 slots SLOT1 TO SLOT8 by making the down-stream frequency carrier F23 in a use state and allocates one slot SLOT1 by making the up-stream frequency carrier F15 in a use state. When the mobile station 136 requests slot allocation, communications is established by making the down-stream frequency carrier F24 in a use state and then allocating 8 slots SLOT1 TO SLOT8 and by allocating one slot SLOT2 from the up-stream frequency carrier F15 in a use state.

Thus, all slots of 8 frequency carriers including the frequency carriers F11, F12, F13 and F14 in the frequency band FB1 and the frequency carriers F21, F22, F23 and F24 in the frequency band FB2 are used in the down-stream communications. Two slots of each of 4 frequency carriers including the frequency carriers F15 and F16 in the frequency band FB1 and the frequency carriers F25 and F26 in the frequency band FB2 are used in the up-stream communications. Thus, two frequency bands having six frequency carriers are used regardless of all slots in the down-stream frequency carriers allocated, so that communications can be established by allocating down-stream slots to 8 mobile stations. That is, where the frequency carriers are divided without grouping, the slot in the down-stream can be allocated up to six mobile stations. However, the frequency carrier allocating method according to the present invention allows more mobile stations to communicate with a base station.

In FIG. 1, a base station belonging to the group BSG1 selects down-stream frequency carriers from the frequency band FB1 in the frequency increasing order and selects up-stream frequency carriers from the frequency band FB2 in the frequency decreasing order. A base station belonging to the group BSG2 selects down-stream frequency carriers from the frequency band FB2 in the frequency increasing order and selects up-stream frequency carriers from the frequency band FB1 in the frequency decreasing order. However, the frequency carrier selecting method should not be limited to the above-mentioned embodiment. For example, the base station belonging to the group BSG1 may select the down-stream frequency carriers from the frequency band FB1 in the frequency increasing order and select the up-stream frequency carriers from the frequency band FB2 in the frequency increasing order. The base station belonging to the group BSG2 may select the down-stream frequency carriers from the frequency band FB2 in the frequency decreasing order and select the up-stream frequency carriers from the frequency band FB1 in the frequency decreasing order.

Furthermore, according to the present invention, since the down-stream frequencies and the up-stream frequencies are commonly allocated in each group, the interval for which a frequency carrier is repeatedly used can be made small, so that the frequency carrier spatial use efficiency can be improved. The reason will be described below with reference to FIGS. 11 to 12.

Generally, in the cellular system, the mobile station uses a small antenna for transmission and receiving while the base station uses a large antenna with a larger gain, compared with the mobile station. Hence, the base station can receive feeble rf signals from mobile stations and radiate signals with large power, compared with the mobile station. As a result, the effective radiation power of the down-stream signal is larger than that of the up-stream signal.

Figure 11:
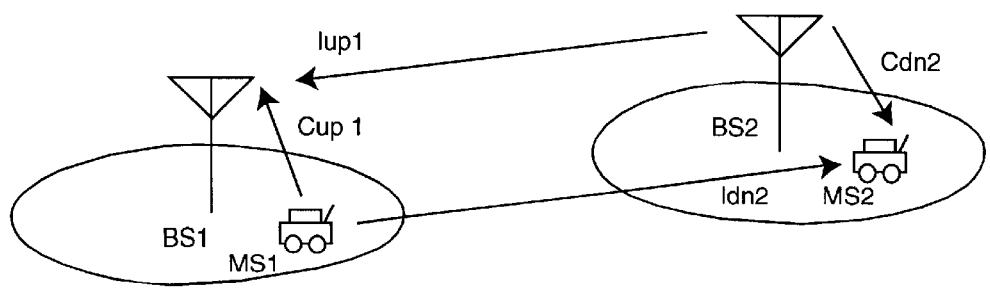
FIG. 11 is a diagram for explaining the effect of an interference when the same frequency carrier is allocated in the up-stream and down-stream by cells.
Figure 12:
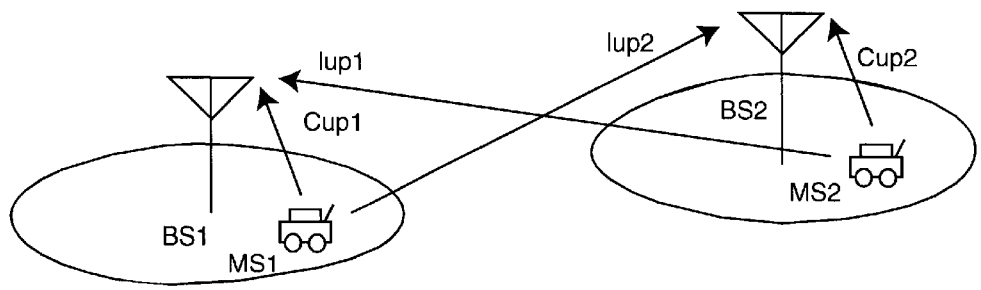
FIG. 12 is a diagram for explaining the effect of an interference when the same frequency carrier is allocated only in the up-stream.

In comparison with the case where the base station BS1 uses the frequency carrier (e.g. F11) in the up-stream and the base station BS2 uses the frequency carrier (e.g. F11) in the down-stream, as shown in FIG. 11, and the case where the base stations BS1 and BS2 use the frequency carrier in the up-stream, as shown in FIG. 12, the effective radiation power of the base station BS1 shown in FIG. 11 is larger than that of the mobile station MS1. For that reason, the power ratio Cup1/Iup1, or the ratio in power of the signal (carrier) from the mobile station MS1 received by the base station BS1 to the interference from the base station BS2, is smaller than the power ratio Cdn2/Idn2, or the ratio in power of the carrier from the base station BS2 received by the base station BS2 to the interference from the mobile station MS1.

Referring to FIG. 12, the power ratio Cup1/Iupi of a carrier to an interference in the base station BS1 is nearly equal to the power ratio Cpup2/Iup1 of a carrier to an interference in the base station BS2. Similarly, the power ratio of a signal wave to an interference in the case where a frequency carrier is allocated in the down-stream by two base stations is equal to that in the up-stream. Since the effective radiation power from the base station is larger than that from the mobile station, the carrier to interference power ratio Cup1/Iup1 in the base station BS1 in the case where a frequency carrier is simultaneously used in the up-stream and the down-stream as shown in FIG. 11 is smaller than the carrier to interference power ratio Cup1/Iup1 or Cup2/Iup2 in the base station BS1 in the case where a frequency carrier is used in the same stream as shown in FIG. 12. Hence, in order to increase the carrier to interference ratio in the base station to a larger value than a predetermined value, it is needed to set the frequency carrier repetition use interval to a large value when the same frequency carrier is simultaneously used in the up-stream and the down-stream as shown in FIG. 11. However, according to the present invention, since the frequency carrier is used in the same direction (refer to FIG. 12), the interval between two cells in which the same frequency carrier is used simultaneously can be set to a small value, so that many frequency carriers can be allocated for one cell.

Moreover, according to the present invention, each base station can be located adjacent to base stations as many as possible belonging to another group. That is, even when a base station is in a use state and a base stations in the shortest distance in which the frequency carrier can be repeated belongs to the different group, there is a strong possibility that a base station adjacent to the base station belongs to the same group. Hence, compared with the case where many base stations belonging to the same group are close to each other, each frequency carrier can be used only in the same direction while an increase in repeatedly used distance can be suppressed. As a result, a spatial use efficiency of a frequency carrier can be improved.

Figure 7:
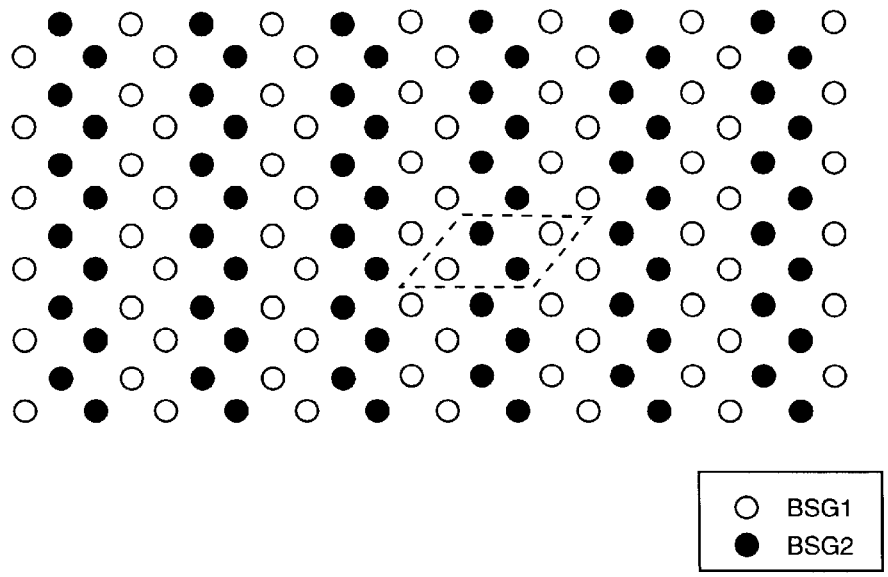
FIG. 7 is a diagram illustrating another distribution of base stations belonging to two groups according to the present invention.

FIG. 7 shows a cell layout different from that in FIG. 4. This layout satisfies at the same time the condition that base stations as many as possible are adjacent to a base station belonging to another group as well as the condition that a nearly half of base stations belonging to one group exist in an arbitrary group of cells in which the same frequency carrier cannot be simultaneously used. As understood from the cell layout example shown in FIG. 4 or 7, the present invention is designed such that the base stations in a cell range in which the same frequency carrier cannot be simultaneously used are not unevenly distributed.

Figure 13:
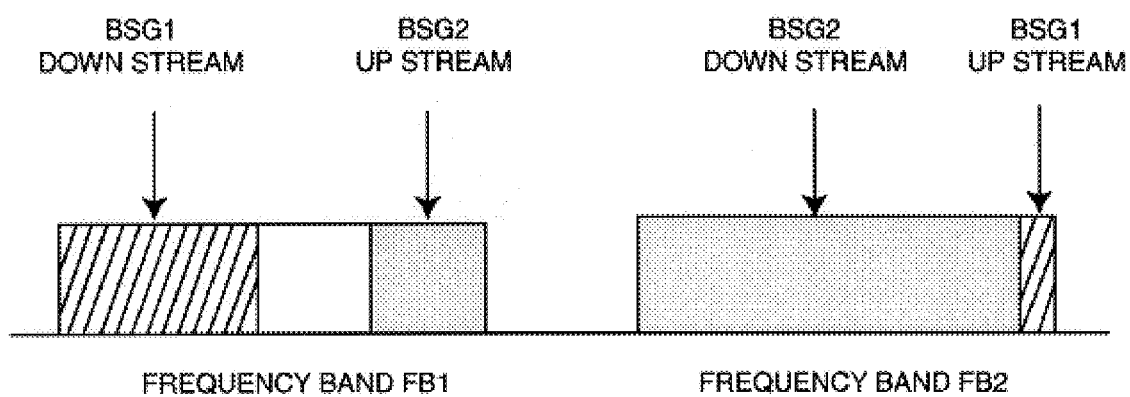
FIG. 13 is a diagram explaining a frequency band use status when base stations are unevenly grouped locally.

FIG. 13 shows the frequency band use states in the case where base stations are unevenly grouped. That is, as shown in FIG. 13, when the traffic in the down-stream is greater than that in the down-stream and there are many base stations in the group BS2, all frequency carriers are used in the frequency band FB2. However, in the frequency carrier FB1, the ratio of frequency carriers used in the up-stream to frequency carriers used in the down-stream is fixed for each base station group. Hence, although frequency carriers in a non-use state exist in the frequency band FB1 at the time there are no usable frequency carriers in the frequency band FB2, the frequency carrier cannot be allocated in the up-stream in the group BSG1 and in the down-stream in the BSG2.

In contrast, in the cell distribution as shown in FIG. 4 or 7, since base stations in the cell range in which the same frequency cannot be simultaneously used are not excessively distributed in one group, the frequency carriers in both the frequency bands can be effectively used. Moreover, since frequency carriers not used in both the frequency bands can be easily secured, they tend to be dynamically allocated in the up-stream or the down-stream, so that frequency carriers can be easily reallocated according to the traffic ratio in the up-stream and the down-stream.

According to the present invention, frequency carriers can be optimally distributed in the up-stream and the down-stream without changing the conventional transmitter and receiver configuration in the base station and the mobile station. Particularly, even when the traffic in the up-stream is not equal to that in the down-stream, the present invention can improve the frequency carrier use efficiency and improve the bi-directional communication capacity between a base station and a mobile station.

Furthermore, even when the traffic ratio in the up-stream and the down-stream varies, the frequency carriers can be easily re-distributed. Hence, the bi-directional communication capacity between the base station and the mobile station can be maintained in a maximum state by varying the dynamic allocation of frequency carriers.

The entire disclosure of Japanese Patent Application No. 9-245910 filed on Aug. 28, 1997 including specification, claims, drawing and summary are incorporated herein by reference in its entirety.

What is claimed is:

1. A frequency carrier allocating method for a cellular system, said cellular system including plural base stations and plural mobile stations, said cellular system having two frequency bands each in which plural frequency carriers each divided into plural time slots are arranged and in which frequencies are not overlapped, each of said plural base stations allocating a downstream frequency carrier and a time slot in a down stream for transmission from a base station to a mobile station according to a communication request with said mobile station and allocating an upstream frequency carrier and a time slot in an up stream for transmission from said mobile station to said base station according to a communication request with said mobile station, so that said cellular system performs bi-directional communications between said base station and said mobile station, said method comprising the steps of:

dividing said plural base stations into two groups including a first group (BSG1) and a second group (BSG2);

allocating said upstream frequency carrier used in an up stream from a first frequency band (FB1) from one of said two frequency bands in one of said plural base stations belonging to said second group (BSG2), and allocating a downstream frequency carrier used in a down stream from a second frequency band (FB2) from one of said two frequency bands in said one base station belonging to said second group (BSG2); and allocating an upstream frequency carrier used in an up stream from the second frequency band (FB2) from one of said two frequency bands in another of said plural base stations belonging to said first group (BSG1), and allocating a downstream frequency carrier used in a down stream from the first frequency band (FB1) from one of said two frequency bands in said another base station belonging to said first group (BSG1).

2. The frequency carrier allocating method defined in claim 1, wherein a required number of time slots for said upstream or downstream frequency carrier are allocated according to a traffic in an up stream and a traffic in a down stream, respectively.

3. The frequency carrier allocating method defined in claim 1, wherein the same number of the base stations belonging to said two groups is included in a given group of cells each in which the same frequency carrier cannot be simultaneously used; and wherein each of said base stations are located to be adjacent to more base stations belonging to different group.

4. The frequency carrier allocating method defined in claim 1, wherein said frequency carrier allocating step comprises the steps of sequentially selecting from one side of said plural frequency carriers in each frequency band in a base station belonging to said first group; sequentially selecting from the other side of said frequency carrier arrangement between base stations belonging to said second group; and allocating a frequency carrier first-satisfying a quality condition.

5. The frequency carrier allocating method defined in claim 4, further comprising the step of dynamically allocating said upstream or down-stream frequency carrier and time slot in accordance with an increase or decrease in an up stream traffic and a down stream traffic of each base station, respectively.

6. The frequency carrier allocating method defined in claim 1, wherein said frequency carriers in said first group is allocated in a frequency increasing order; and wherein said frequency carriers in said second group is allocated in a frequency decreasing order.

7. The frequency carrier allocating method defined in claim 1, wherein said frequency carriers in said second group is allocated in a frequency decreasing order; and wherein said frequency carriers in said first group is allocated in a frequency increasing order.

8. The frequency carrier allocating method defined in claim 1, wherein one of said first and second base station groups selects the frequency carriers used in the same direction from a frequency band different from said first and second frequency bands.

9. The frequency carrier allocating method defined in claim 1, wherein each base station group selects the frequency used in the opposite direction from another frequency band.

10. The frequency carrier allocating method defined in claim 1, wherein said cellular system comprises a FDD (Frequency Division Duplex) cellular system.

* * * * *